United States Patent

[11] 3,610,636

[72] Inventor Donald W. Scott
East Aurora, N.Y.
[21] Appl. No. 885,885
[22] Filed Dec. 17, 1969
[45] Patented Oct. 5, 1971
[73] Assignee The Quaker Oats Company

[54] MECHANICAL SOUND-REPRODUCING SYSTEM
21 Claims, 3 Drawing Figs.

[52] U.S. Cl. .......... 274/9 R
[51] Int. Cl. .......... G11b 3/26
[50] Field of Search .......... 274/7, 9, 15, 1.1

[56] References Cited

UNITED STATES PATENTS

| | | | |
|---|---|---|---|
| 851,311 | 4/1907 | Palmer | 274/9 |
| 1,178,840 | 4/1916 | Cassard | 274/9 |
| 3,287,020 | 11/1966 | Beebe | 274/9 |

FOREIGN PATENTS

| | | | |
|---|---|---|---|
| 980,829 | 1/1951 | France | 274/9 |

*Primary Examiner*—Harry N. Haroian
*Attorney*—Cumpston, Shaw & Stephens

ABSTRACT: The invention improves on systems for mechanically reproducing sound from a mechanically modulated groove tracked by a stylus. The stylus is carried on a pivotal rocker arm that engages a transverse speaker rocker arm one side of which is coupled to a speaker. Surfaces of the stylus rocker arm on opposite sides of its pivot axis engage surfaces of the speaker rocker arm on opposite sides of its pivot axis so that motion of the stylus rocker arm is transmitted to the speaker rocker arm and through the coupling to the speaker.

INVENTOR.
DONALD W. SCOTT
BY Cumpston, Shaw and Stephens
ATTORNEYS

INVENTOR.
DONALD W. SCOTT

BY Crompton, Shaw and Stephens
ATTORNEYS

MECHANICAL SOUND-REPRODUCING SYSTEM

THE INVENTIVE IMPROVEMENT

Mechanical sound-reproducing systems are widely used in toys, but they have suffered from poor fidelity and sound quality, rapid sound deterioration and short toy life, unreliability, and inability to withstand the abuses suffered by toys. Many of these faults are attributable to high stylus forces and spring bias needed to track vertically modulated grooves, and relatively stiff and low-compliance couplings between the stylus and the speaker. The objects of the invention are generally to make an improved mechanical sound-reproducing system less subject to failures of prior art systems, and to accomplish such improvements in an economical and reliable system having long life and better quality sound. Particularly, the invention aims at low stylus force and a high-compliance coupling between the stylus and the speaker.

SUMMARY OF THE INVENTION

The inventive sound-reproducing system includes a speaker, a phonograph record having a mechanically modulated groove, a pickup stylus, and means for producing relative movement between the groove and the stylus. The stylus is carried on a rocker arm pivotally supported so that movement of the stylus in response to the groove modulations rocks the stylus rocker arm about the pivot axis. A speaker rocker arm is arranged generally transverse to the stylus rocker arm and is pivotally supported for rocking about a pivot axis. The central region of the speaker is coupled to the speaker rocker arm off its pivot axis, and surfaces of the stylus rocker arm on opposite sides of its pivot axis engage surfaces of the speaker rocker arm on opposite sides of its pivot axis so that stylus rocker arm motion is transmitted through the speaker rocker arm and the coupling to the speaker.

DRAWINGS

DETAILED DESCRIPTION

Figure 1:
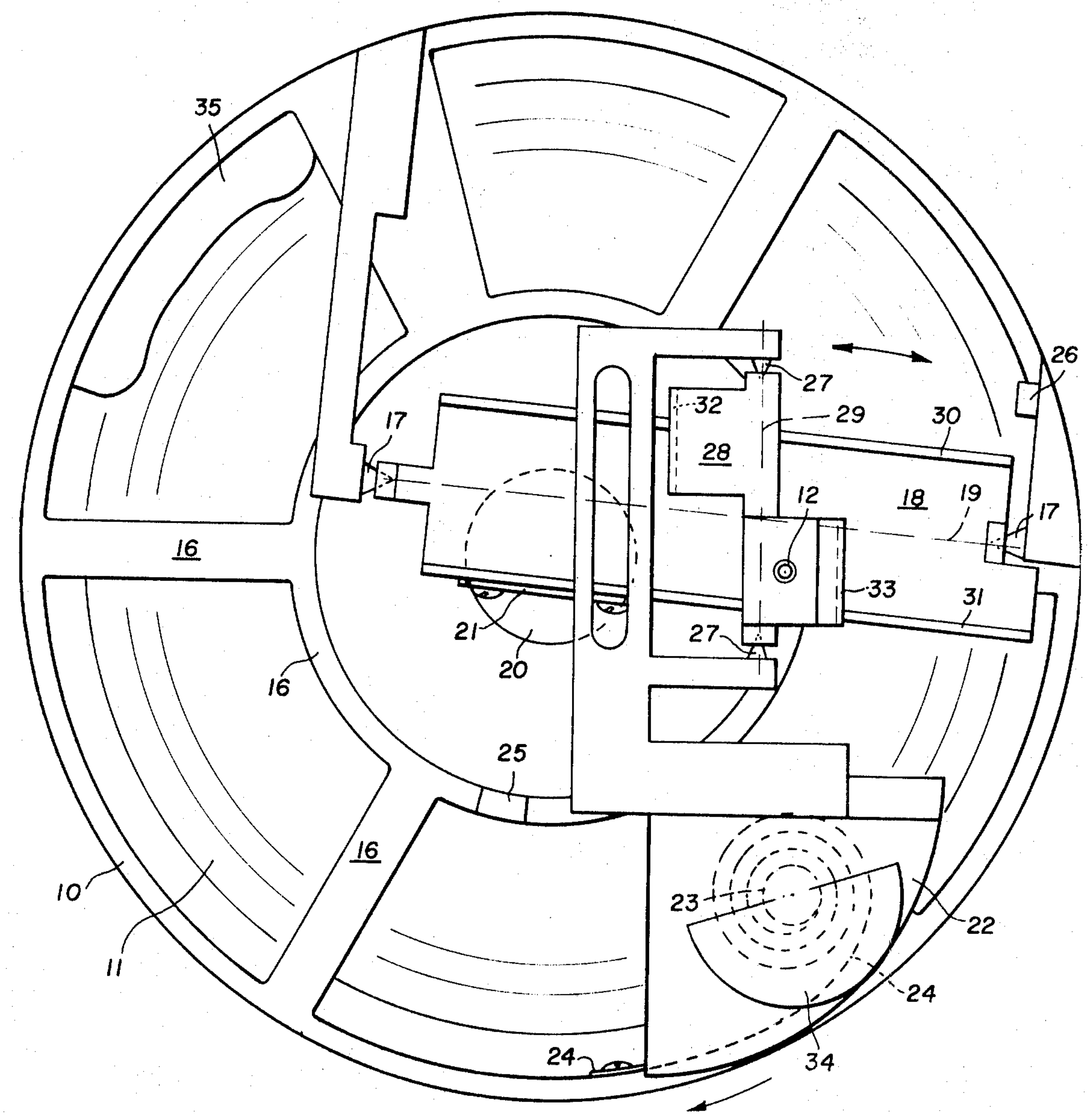
FIG. 1 is a plan view of a preferred embodiment of the inventive mechanical sound reproducing system.
Figure 2:
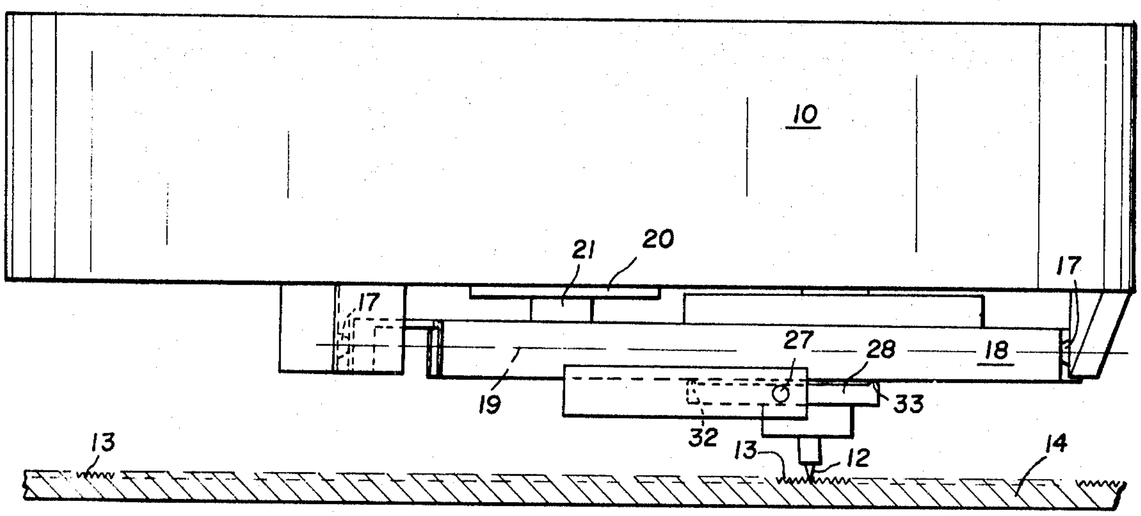
FIG. 2 is a front elevational view of the embodiment of FIG. 1.
Figure 3:
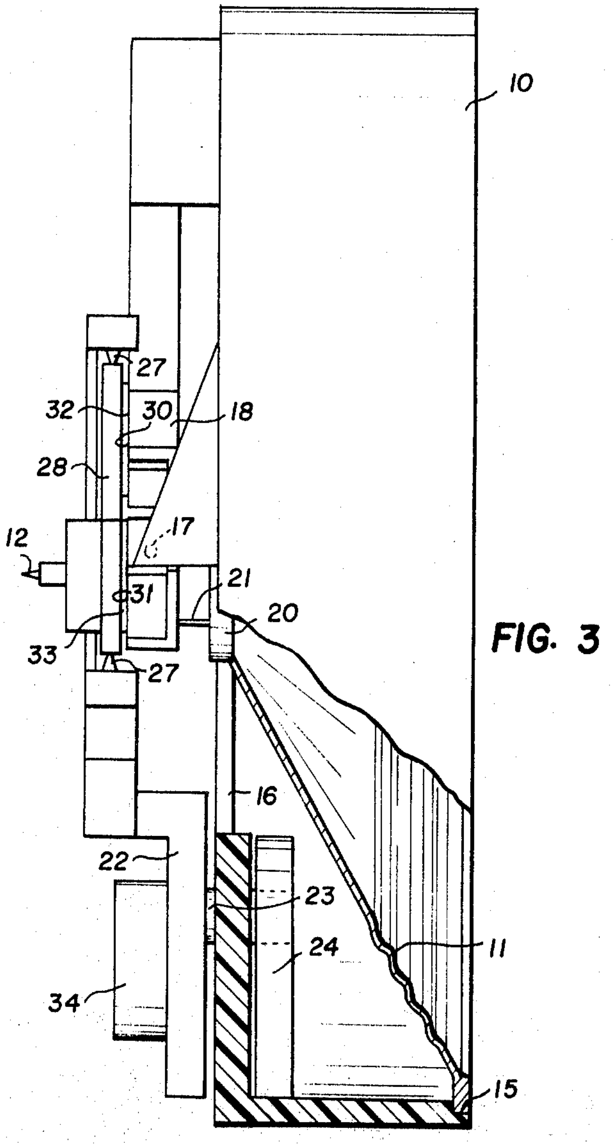
FIG. 3 is a partially cutaway side elevational view of the embodiment of FIG. 1.

The illustrated system includes a rotatable head 10 turned in the direction of the arrow, and carrying a speaker 11 and a stylus 12 for tracking a groove 13 in the phonograph record 14. Groove 13 is formed as a spiral in record 14 and has mechanical modulations that are preferably lateral relative to the grooves to form an audio recording as generally known in the art. Stylus 12 preferably follows the spiral path of grooves 13 inwardly as head 10 rotates. The inventive system is an improved means for transmitting the vibrations from stylus 12 in response to groove 13 to speaker 11 to produce sound.

The illustrated embodiment of the invention operates with record 14 stationary and head 10 rotating, but the invention can also be practiced by moving record 14 while speaker 11 remains relatively stationary. Groove 13 can be tracked outwardly or can be formed as a straight line, turns around a cylinder, etc.

Head 10 is preferably formed of plastic material in the general cylindrical shape illustrated to support speaker 11 on ledge 15 around the inside periphery of head 10. A framework 16 extends across head 10 at the back of speaker 11 with openings for transmission of the back radiation from speaker 11.

Framework 16 on head 10 carries gudgeons or pivots 17 pivotally supporting speaker rocker arm 18 for rocking motion about its pivot axis 19 extending between pivots 17. A plug 20 joined to speaker 11 in its central region is fastened to one side of speaker rocker arm 18 by a flexible tab 21 extending from plug 20. Tab 21 connects to speaker rocker arm 18 off the pivot axis 19 so that rocking motion of speaker rocker arm 18 drives tab 21 in and out to vibrate speaker 11. Tab 21 and plug 20 are preferably formed of plastic and can have a variety of shapes. Also, tab 21 can be secured to rocker arm 18 in a variety of ways or can be formed integrally with rocker arm 18 and secured to plug 20. Tab 21 or other connector between speaker 11 and speaker rocker arm 18 is substantially rigid in the driving direction of speaker 11, but sufficiently flexible transverse to this direction so that it can bend slightly as rocker arm 18 moves.

Head 10 also carries tone arm 22 having a pivot 23 extending through framework 16 to allow arm 22 to move back and forth as indicated by the double-headed arrow. A spring 24 secured to head 10 and pivot 23 biases tone arm 22 radially outward relative to head 10 so that stylus 12 starts in an outer turn of groove 13 and tracks inward. Stylus 12 could also track outward, and for this, spring 24 would be arranged to bias tone arm 22 inward relative to head 10. The pivotal motion of tone arm 22 is limited by an inward stop 25 and an outward stop 26.

Gudgeons or pivots 27 on tone arm 22 support stylus rocker arm 28 for pivotal rocking motion about is pivot axis 29 extending between pivots 27. Vibrations of stylus 12 in response to the modulations in groove 13 produce rocking motion in stylus rocker arm 28. With the preferred lateral groove modulations, stylus 12 is preferably mounted near pivot axis 29 but the same general arrangement could be used for vertical groove modulations with stylus 12 mounted well of pivot axis 29.

Bearing ridges 30 and 31 are formed on the edges of speaker rocker arm 18 on opposite sides of pivot axis 19, and face or extend toward stylus rocker arm 28. Stylus rocker arm 28 has bearing surfaces 32 and 33 on opposite sides off pivot axis 29 respectively engaging and moving along ridges 30 and 31 of speaker rocker arm 18. This provides a two-point contact between stylus rocker arm 28 and speaker rocker arm 18 throughout the travel of stylus rocker arm 28. Other arrangements could also provide the desired two-point contact, including hemispherical buttons on stylus rocker arm 28 engaging a flat speaker rocker arm. As stylus 12 bears against groove 13, stylus rocker arm 28 maintains its two-point contact with speaker rocker arm 18, and the pivot arc of tone arm 22 is such that this contact is continuous all the way between stops 25 and 26.

In operation, if a groove modulation moves stylus 12 to depress surface 33 and elevate surface 32 relative to speaker rocker arm 18, then ridge 31 is depressed and ridge 30 is elevated to move tab 21 for advancing speaker 11 to create a frontal compression phase. A modulation in the other direction moves stylus 12 to depress surface 32 and elevate surface 33 relative to speaker arm 18. This depresses ridge 30 and elevates ridge 31 to move tab 21 for retracting speaker 11 to form a frontal rarefaction phase. The modulations of groove 13 are thus transmitted through stylus 12, stylus rocker arm 28, speaker rocker arm 18, tab 21, and plug 20 to speaker 11 for producing the sound recorded in the modulations of groove 13.

Since spring 24 biases tone arm 22 outward, an inward tracking force is exerted on stylus 12 by the outer edge of groove 13 as stylus 12 follows the inward spiral of groove 13. This inward tracking force tends to rotate stylus rocker arm 28 to depress surface 32 and elevate 33. To compensate for this, stylus 12 is offset from pivot axis 29 radially outward so that its force against groove 13 normal to the plane of record 14 tends toward an opposite rotation of stylus rocker arm 28. This keeps stylus rocker arm 28 in relative equilibrium between pressure and tracking forces and improves the fidelity of the sound.

The frictional drag on stylus 12 tends to rotate stylus rocker arm 28 longitudinally to press upward on after pivot 27 and downward on forward pivot 27. This tends to elevate surfaces 32 and 30 and depress surfaces 33 and 31 to create a bias or speaker rocker arm 18. To compensate, stylus 12 is preferably mounted forward of the pivot axis 19 of speaker rocker arm 18 in the direction of travel of stylus 12 in groove 13. The rotational tendency from stylus force normal to record 14 then balances the torque from the frictional drag.

Preferably, tone arm 22 is balanced by weight 34 arranged on the opposite side of journal 23 from stylus rocker arm 28 and balance weight 35 is preferably added to head 10 opposite tone arm 22 so that the entire assembly is rotationally balanced. Many adaptations and refinements can be made in suiting the system to particular uses.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, the inventive device can be used for fixed or moving phonograph records having straight or spiral grooves; it can accommodate a variety of speakers, mounting supports, and coupling devices; its parts can be shaped in many different ways; and it can be used in a variety of toys and simple sound-reproducing systems.

I claim:

1. A mechanical sound reproducing system comprising:

a. a speaker;
b. a phonograph record having a mechanically modulated groove;
c. a pickup stylus;
d. means for producing relative movement between said groove and said stylus;
e. a stylus rocker arm carrying said stylus;
f. means pivotally supporting said stylus rocker arm so movement of said stylus in response to said groove modulations rocks said stylus rocker arm about a pivot axis;
g. a speaker rocker arm;
h. means pivotally supporting said speaker rocker arm for rocking motion about a pivot axis;
i. means for coupling the central region of said speaker to a region of said speaker rocker arm off said pivot axis of said speaker rocker arm; and
j. a portion of said stylus rocker arm off said pivot axis of said stylus rocker arm engaging a portion of said speaker rocker arm off said pivot axis of said speaker rocker arm for transmitting motion to said speaker rocker arm.

2. The system of claim 1 wherein surfaces of said stylus rocker arm on opposite sides of said pivot axis of said stylus rocker arm engage surfaces of said speaker rocker arm on opposite sides of said pivot axis of said speaker rocker arm in a two-point interengagement.

3. The system of claim 2 including ridges formed along the edges of said speaker rocker arm on opposite sides of said pivot axis of said speaker rocker arm, one of said surfaces of said stylus rocker arm on one side of said pivot axis of said stylus rocker arm engaging only one of said ridges, and another surface of said stylus rocker arm on the opposite side of said pivot axis of said stylus rocker arm engaging only the other of said ridges.

4. The system of claim 1 wherein said groove modulations are lateral.

5. The system of claim 1 wherein said stylus is mounted forward of said pivot axis of said speaker rocker arm in the direction of motion of said stylus relative to said groove.

6. The system of claim 1 wherein said groove is formed as a spiral, and a rotatable head concentric with said groove supports said speaker.

7. The system of claim 1 wherein said groove is formed as a spiral, said speaker rocker arm extends outward from said central speaker region, and a pivotally mounted tone arm carries said stylus-rocker-arm-supporting means for moving said stylus rocker arm generally along said speaker rocker arm.

8. The system of claim 7 wherein surfaces of said stylus rocker arm on opposite sides of said pivot axis of said stylus rocker arm engage surfaces of said speaker rocker arm on opposite sides of said pivot axis of said speaker rocker arm in a two-point interengagement throughout the travel of said stylus rocker arm along said speaker rocker arm.

9. The system of claim 8 including ridges formed along the edges of said speaker rocker arm on opposite sides of said pivot axis of said speaker rocker arm, one of said surfaces of said stylus rocker arm on one side of said pivot axis of said stylus rocker arm engaging only one of said ridges, and another surface of said stylus rocker arm on the opposite side of said pivot axis of said stylus rocker arm engaging only the other of said ridges.

10. The system of claim 7 wherein said stylus is mounted forward of said pivot axis of said speaker rocker arm in the direction of motion of said stylus relative to said groove.

11. The system of claim 10 wherein said groove modulations are lateral.

12. The system of claim 7 wherein a spring is arranged for radially biasing said tone arm relative to said spiral groove, and said stylus is mounted off said pivot axis of said stylus rocker arm in the direction of bias of said spring.

13. The system of claim 12 wherein said spring biases said tone arm radially outward, and said stylus is mounted radially outward from said pivot axis of said stylus rocker arm.

14. The system of claim 12 wherein said stylus is mounted forward of said pivot axis of said speaker rocker arm in the direction of motion of said stylus relative to said groove.

15. The system of claim 14 wherein said groove modulations are lateral.

16. The system of claim 12 wherein surfaces of said stylus rocker arm on opposite sides of said pivot axis of said stylus rocker arm engage surfaces of said speaker rocker arm on opposite sides of said pivot axis of said speaker rocker arm in a two-point interengagement throughout the travel of said stylus rocker arm along said speaker rocker arm.

17. The system of claim 16 wherein said stylus is mounted forward of said pivot axis of said speaker rocker arm in the direction of motion of said stylus relative to said groove.

18. The system of claim 17 wherein said groove modulations are lateral.

19. The system of claim 18 including ridges formed along the edges of said speaker rocker arm on opposite sides of said pivot axis of said speaker rocker arm, one of said surfaces of said stylus rocker arm on one side of said pivot axis of said stylus rocker arm engaging only one of said ridges, and another surface of said stylus rocker arm on the opposite side of said pivot axis of said stylus rocker arm engaging only the other of said ridges.

20. The system of claim 19 wherein said spring biases said tone arm radially outward, and said stylus is mounted radially outward from said pivot axis of said stylus rocker arm.

21. The system of claim 7 wherein said stylus is arranged to track progressively inward.